United States Patent
Menke et al.

(10) Patent No.: US 8,541,330 B2
(45) Date of Patent: Sep. 24, 2013

(54) METHOD OF PRODUCING TRANSPARENT CERAMICS

(75) Inventors: Yvonne Menke, Mainz (DE); Akio Ikesue, Nagoya (JP)

(73) Assignee: Schott AG, Mainz (DE)

( * ) Notice: Subject to any disclaimer, the term of this patent is extended or adjusted under 35 U.S.C. 154(b) by 161 days.

(21) Appl. No.: 12/728,865

(22) Filed: Mar. 22, 2010

(65) Prior Publication Data

US 2010/0248932 A1   Sep. 30, 2010

(30) Foreign Application Priority Data

Mar. 31, 2009  (EP) .................................. 09156993

(51) Int. Cl.
   *C04B 35/00*   (2006.01)
   *C04B 35/48*   (2006.01)
   *C04B 35/49*   (2006.01)

(52) U.S. Cl.
   USPC ........................... 501/126; 501/103; 501/134

(58) Field of Classification Search
   USPC ................... 501/126, 134, 103, 104
   See application file for complete search history.

(56) References Cited

U.S. PATENT DOCUMENTS

| | | | |
|---|---|---|---|
| 5,152,940 A * | 10/1992 | Shibata et al. | 264/1.21 |
| 6,946,208 B2 | 9/2005 | Subramaniam et al. | |
| 2008/0122362 A1 * | 5/2008 | Gratson et al. | 313/636 |
| 2008/0278823 A1 * | 11/2008 | Peuchert et al. | 359/664 |
| 2008/0292859 A1 * | 11/2008 | Subramanian | 428/220 |

FOREIGN PATENT DOCUMENTS

| | | |
|---|---|---|
| EP | 1 992 599 | 11/2008 |
| WO | 2009/038674 | 3/2009 |

OTHER PUBLICATIONS

Yaming Ji, et al: "Fabrication of Transparent . . . " Material Research Bulletin 40 (2005), pp. 553-559 (In Eng.).
Ulrich Peuchert et al: "Transparent Cubic ZrO2 Ceramics for Application as Optical Lenses . . . " Journal of the European Ceramic Society 29, 2009, pp. 283-291.

* cited by examiner

Primary Examiner — Kaj Olsen
Assistant Examiner — Noah Wiese
(74) Attorney, Agent, or Firm — Michael J. Striker

(57) ABSTRACT

The method of making a transparent ceramic includes making a molded body from a powder mixture of starting materials, which include one or more sintering aids. The sintering aids can include $SiO_2$, $TiO_2$, $ZrO_2$, $HfO_2$, $Al_2O_3$ and/or fluorides. The transparent ceramic is made by pre-sintering the molded body at temperatures between 500° C. to 900° C., subsequently sintering in vacuum at temperatures between 1400° C. and 1900° C. and then pressurizing the sintered molded body at a pressure of from 10 to 198 MPa followed by annealing. The optoceramic material contains crystals with a stoichiometry of $A_{2+x}B_yB_yD_zE_7$, wherein $-1.15 \leq x \leq +1.1$, $0 \leq y \leq 3$, $0 \leq z \leq 1.6$ and $3x+4y+5z=8$; and wherein A is a trivalent rare earth cation, B is a tetravalent cation, D is a pentavalent cation and E is a divalent anion.

13 Claims, 1 Drawing Sheet

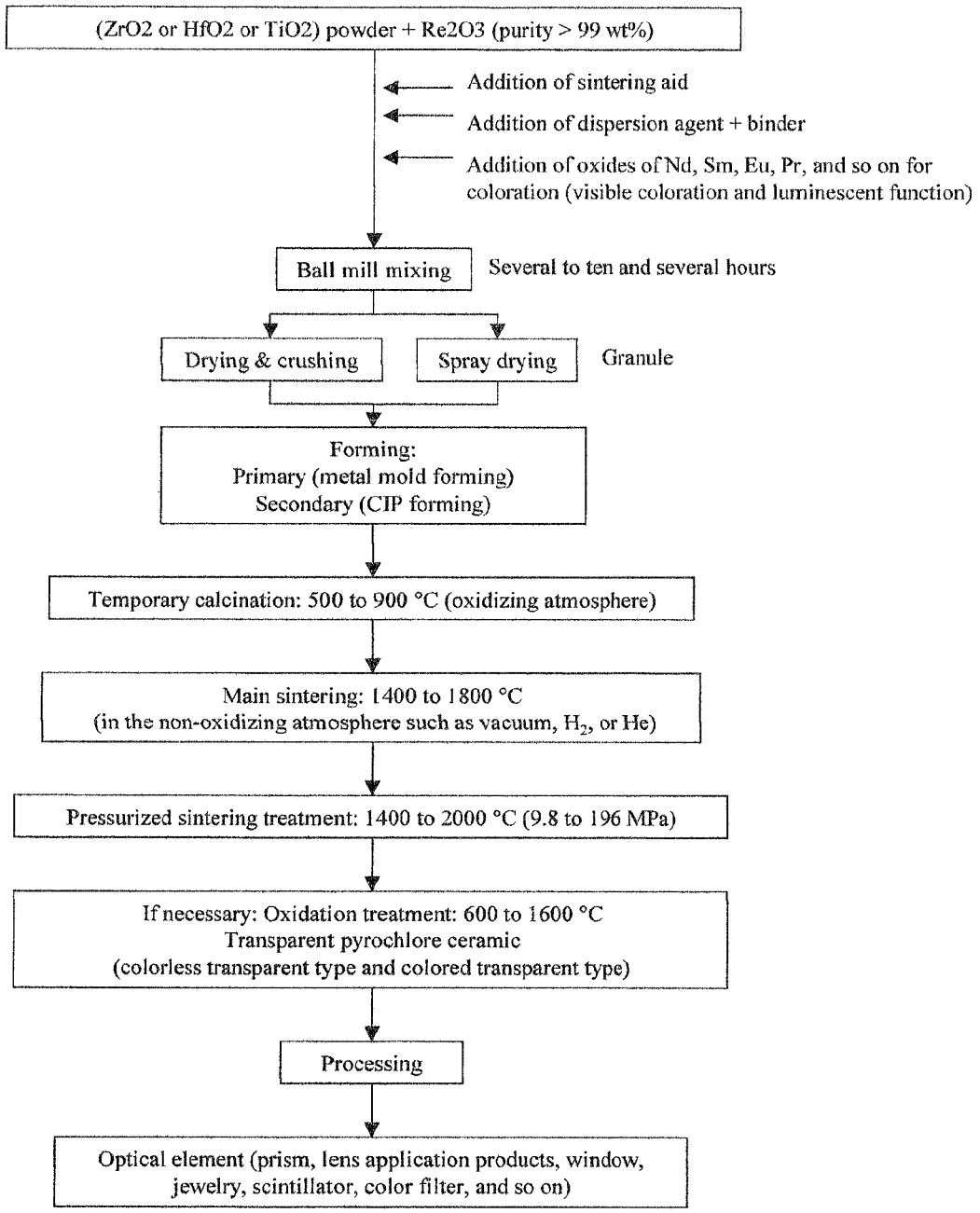

METHOD OF PRODUCING TRANSPARENT CERAMICS

CROSS-REFERENCE

The invention described and claimed herein below is also described in European Patent Application 09 156 993.9, filed Mar. 31, 2009 in Europe. The aforesaid European Patent Application, whose subject matter is incorporated herein by reference thereto, provides the basis for a claim of priority of invention for the invention claimed herein below under 35 U.S.C. 119 (a)-(d).

BACKGROUND OF THE INVENTION

The present invention relates to a method for production of transparent ceramics making use of sintering aids. The invention also relates to the use of specific substances as sintering aids. The ceramics described in this invention are so-called optoceramics.

An optoceramic according to the present invention is understood to be highly transparent material that is essentially single phase, polycrystalline and based on an oxide or a chalcogenide. Optoceramics are thus a special subdivision of ceramics. "Single phase" in this context is understood to mean that at least more than 95% by weight of the material, preferably at least 97% by weight, more preferably 99% by weight and most preferably 99.5 to 99.9% by weight of the material is present in the form of crystals of the desired composition. The individual crystals are densely arranged and, relative to the theoretical density, have densities of at least 99% by weight, preferably at least 99.9% by weight, and more preferably at least 99.99% by weight. Accordingly, the optoceramics are nearly free of pores.

Optoceramics are distinguished from glass ceramics by the fact that glass ceramics comprise high proportions of amorphous glass phase next to crystalline phase. Similarly, the high densities of optoceramics may not be achieved with conventional ceramics. Neither glass ceramics nor conventional ceramics have the advantageous properties of optoceramics like certain refractive indexes, Abbe numbers, values of relative partial dispersion and particularly the advantageous high transparency for light in the visible and/or infrared spectral range.

The optoceramics obtained by carrying out the method of the present invention show improved transmission properties when compared to other transparent ceramics. The transmission properties are characterized in terms of internal transmittance. "Internal transmittance" in the field of optoceramics, unlike the field of glass, describes the percentaged ratio of transmitted light intensity and the maximum light transmission achievable with the respective material. This value is indicative of the quality of the optoceramics in terms of favorably low scattering loss. Therefore, "internal transmittance" in the field of optoceramics describes the loss of light intensity within the ceramic that is due to light scattering at grain boundaries or pores and absorption of impurities. The internal transmittance in accordance with the present invention is determined by measurement of the in-line transmission of the respective ceramic material. Determining in-line transmissions is a standard procedure for the person of ordinary skill in the art.

The present invention especially refers to a method for production of transparent, polycrystalline optoceramics comprising crystal composites with a stoichiometry of $A_{2\pm x}B_{2\pm x}E_7$. At least 95% by weight of these crystals have symmetrical, cubic crystal structures. The crystal structures are of the pyrochlore- or fluorite-type. The method of production according to the present invention provides for a cost effective production of optoceramics.

The method for production of optoceramics according to the present invention provides for improved optical properties of the thus obtained material. By making use of certain sintering aids the optoceramics obtained by carrying out the process are essentially free of pores, so that penetrating light is not refracted or scattered at grain boundaries. The optoceramics obtained according to the process of the present invention have similar optical properties as single crystals but are cost-effectively obtainable and moldable.

The prior art describes optoceramics with pyrochlore structure. These are for example disclosed in Ji et al., "Fabrication of transparent $La_2Hf_2O_7$ ceramics from combustion synthesized powders", Mat. Res. Bull. 40(3) 553-559 (2005)". This publication describes use of powders having similar chemical compositions like those of the present invention. The powders in this publication are synthesized by combustion reactions. Making use of this method of production only such ceramics are obtainable, which have transparency values in the region of 70% at a sample thickness of <1 mm. This is not enough for optical applications.

SUMMARY OF THE INVENTION

It is evident from the above-said that there is a strong need for optoceramics having such superior properties in terms of being pore-free and thus offering high transmissions. It is therefore the object of the present invention to provide a method for production of transparent, polycrystalline ceramics having superior optical qualities so that they can be manufactured into optical elements like lenses or prisms.

This object is achieved by improved production methods of ceramics as set out in the claims. The object is further achieved by using certain components as sintering aids as set out in the claims.

The method for production of optoceramics according to the present invention is a process for production of transparent, polycrystalline ceramics comprising crystal composites of the stoichiometry $A_{2+x}B_yD_zE_7$, wherein $-1.15 \leq x \leq +1.1$, $0 \leq Y \leq 3$, $0 \leq Z \leq 1.6$, and $3x+4y+5z=8$; and wherein A is at least one rare earth trivalent cation, B is at least one tetravalent cation, D is at least one pentavalent cation, and E is at least one divalent anion.

It is further preferred that $-1 \leq x \leq +1.0$ more preferred $-0.5 \leq x \leq +0.5$, more preferred $-0.25 \leq x \leq +0.25$.

The optoceramics that are manufactured according to the process of the present invention preferably comprise at least 95% by weight of crystals having cubic pyrochlore or fluorite structures. The average grain size of the optoceramics preferably is in the range of from 5 to 300 μm, preferably from 5 to 250 μm and more preferably from 5 to 150 μm. These optoceramics must be very densely sintered in order to provide for the improved properties. In order to arrive at such advantageous material, the process according to the present invention comprises the following step:

a) manufacturing a molded body from a powder mixture of starting materials including at least one sintering aid selected from the group consisting of $SiO_2$, $TiO_2$, $ZrO_2$, $HfO_2$, $Al_2O_3$ and fluorides.

The average primary particle diameter of the sintering aids preferably is from 20 to 500 nm. The sintering aids are preferably added in a form that is selected from the group consisting of oxide and fluoride powder as well as gels or gel precursors. The gel can be a silica gel and the gel precursor can be in the form of a monomer, for example TEOS (tetraethyl orthosilicate).

The starting materials according to point a) are all components that are necessary to form the later optoceramic material. These can for example be compounds like $A_2E_3$ or $BE_2$ as well as the sintering aids. The powder mixture is preferably obtained by mixing the main components, for example $A_2E_3$ and $BE_2$, with dispersants, binders and sintering aids in ethanol and subsequently mixing and grinding these components between $ZrO_2$ balls in a ball mill. Afterwards the resulting powder is dried and subjected to step a) above.

The process preferably comprises the additional step of:
b) pre-sintering the molded body preferably at temperatures between 500 and 900° C.

The temperatures for pre-sintering according to step b) are dependent from the type of optoceramic that is planned to be produced as well as from the respective sintering aid that is used in the batch. The skilled person will easily determine the required exact pre-sintering temperatures.

Additionally, the process may comprise the following step:
c) sintering of the pre-sintered molded body preferably at temperatures between 1400 and 2000° C., preferably within a pressure range of 1 bar absolute and $10^{-7}$ mbar absolute, more preferably in a pressure range between $10^{-3}$ to $10^{-7}$ mbar. The temperature is more preferably between 1500 and 1900° C., most preferably between 1600 and 1850° C.

The process may also comprise the further step of
d) pressurizing the sintered molded body preferably at temperatures between 1400 and 2000° C. and preferably at pressures between 10 and 300 MPa. More preferred are pressures between 50 and 250 MPa, pressures between 100 and 200 MPa are most preferred.

The optoceramics according to the present invention are suitable to provide shapes and structures that are not obtainable with single crystals, because they are moldable in contrast to single crystals. By making use of the process according to the present invention, it has become possible to provide optoceramics that almost have the desirable properties of single crystals while being cost-effectively obtainable.

Usually, polycrystalline bodies have bad transmission properties because they comprise many crystal grain boundaries and the penetrating light suffers losses at these grain boundaries. Single crystals do not have grain boundaries and thus do not suffer these transmission losses. Consequently, it is extremely difficult to provide suitable transparent, polycrystalline ceramics that meet the high prerequisites demanded for media for laser oscillation and optical elements like prisms and lenses that are meant to be used in optical devices.

The transparent, polycrystalline optoceramics obtained by carrying out the process according to the present invention have such high optical quality that they are suitable to be manufactured into optical elements despite their polycrystallinity.

By making use of the method of production according to the present invention it is no longer necessary to carry out time-consuming single crystal growth. Growth of single crystals suffers the disadvantage that it has to be carried out at very high temperatures of for example about 2400° C. for a long period of time. This leads to high costs for energy leading to the fact that single crystals are not suitable for mass production. The method according to the present invention, however, allows drastically reducing costs for energy and simultaneously shortening production time, thus leading to the fact that the optoceramics according to the present invention are obtainable by mass production. The method of production according to the present invention is especially suited to produce molded bodies for optical elements like lenses and prisms, which are already very near to the desired net shape. Thereby costly post-processing steps can be cut down.

In the following the optoceramics that are readily manufactured by the process according to the present invention are defined in terms of their constituents. The skilled person can easily derive from the molecular formula, which starting components are to be used in step a) of the process.

A is preferably selected from the group consisting of Y, Gd, Yb, Lu, Sc, La and mixtures of these components. It is further preferred that A is selected from the group consisting of Y, Gd, Yb, Lu, Sc and mixtures of these components. It is further preferred that A is selected from the group consisting of Gd, Lu, Yb and mixtures of these components; it is even more preferred that A is selected from Gd, Lu and mixtures of these components.

B is selected from the group consisting of Zr, Ti, Hf, Sn, Ge and mixtures of these components. It is further preferred that B is selected from the group consisting of Zr, Ti, Hf and mixtures of these components. In a preferred embodiment B is selected from Zr, Hf and mixtures of these components. In another preferred embodiment B is selected from Ti, Hf and mixtures of these components.

D is selected from the group consisting of Nb, Ta and mixtures of these components.

The component present in the E-position of the above-mentioned stoichiometry is selected from the chalcogens. E can also constitute a mixture of different chalcogens. Preferably, E is selected from the group consisting of Se, O, S and mixtures thereof. More preferably, E is selected from the consisting of O, S and mixtures thereof. Most preferably, E is O.

It is further preferred according to the present invention that the transparent, polycrystalline ceramics comprise crystals that consist to an extent of at least 98% by weight of crystals with cubic pyrochlore or fluorite structures.

It has surprisingly been found that addition of sintering aids to the powder mixture in the production process leads to improved properties of the resulting optoceramic material. The sintering aids that are used according to the present invention are selected from the group consisting of $SiO_2$, $TiO_2$, $ZrO_2$, $HfO_2$, $Al_2O_3$ and fluorides. It is possible to use either one single sintering aid or a combination of two or more of the above-mentioned sintering aids. It is preferred that the respective sintering aid used in a process according to the present invention is different from the other components of the optoceramic. That means that in case Ti is the B-component in an optoceramic composition, $TiO_2$ will not be used as sintering aid as well. Besides the sintering aids improving the properties of the finished product, they also speed up the sintering process. Use of sintering aids leads to better products in terms of reduced pores, better transparency and ideal grain structure, while simultaneously the production costs are decreased.

Although the inventors do not want to be bound to this theory, it is believed that the sintering aids help formation of eutectics on the grain boundaries. Starting from this theory, it is evident why the sintering aid shall be different from the main components of the optoceramic composition. The sintering aid shall then be incorporated into the crystal lattice or evaporate from the molded body. Otherwise they would alter the optical properties of the optoceramics. The sintering aids mentioned herein fulfill these prerequisites.

According to the present invention it is preferred that these sintering aids are used in amounts of from 0.01 to 3% by weight of the powder mixture of the starting material. It is further preferred that these sintering aids are used in amounts of from 0.025 to 2% by weight, it is most preferred that the sintering aids are used in amounts of from 0.05 to 1% by weight within the process according to the present invention.

It is preferred according to the present invention that the sintering aid $TiO_2$ is present in optoceramics that comprise Zr or Hf on the B-position. According to an alternative embodiment it is further preferred that the sintering aid $ZrO_2$ is used in case the optoceramics according to the present invention comprise Ti or Hf on the B-position. According to yet another embodiment the sintering aid $HfO_2$ is preferably used in optoceramics that comprise Zr or Ti on the B-position. These combinations of optoceramics and sintering aids lead to superior sintering behavior of the molded body.

The optoceramics according to the present invention can preferably comprise a fluoride as sintering aid. The fluoride provides for excellent sintering behavior and superior optical properties. The proportion in which the fluoride component is present in the optoceramics preferably is the amount of fluoride that is obtained if 0.05 to 3% by weight, more preferably 0.1 to 1.5% by weight of the fluoride is added to the powder mixture during the production process. In general it is not important to choose a special fluoride in order to achieve these effects. However, some fluorides have been found to deliver most desirable effects. It is therefore preferred that the fluoride is selected from the group consisting of $CaF_2$, $MgF_2$, $ScF_3$, $AlF_3$, $YF_3$, $ZrF_4$, $HfF_4$, $TiF_3$, $TiF_4$ and fluorides of the lanthanides. It is most preferred according to the present invention that the fluoride is selected from the group consisting of $YF_3$, $ZrF_4$, $HfF_4$ and $TiF_4$. The proportion of fluoride in the finished ceramic is preferably between 0.05 to 3% by weight and more preferred between 0.1 and 1.5% by weight.

The optoceramics according to the present invention have superior optical properties. Among these optical qualities are internal transmittances, which are preferably at least above 50% at a wavelength of 400 nm and a sample thickness of 5 mm and at the baseline of the 600 nm wavelength light transmittance is at least 60%, for the 5 mm thick sample in the thickness direction. The internal loss in the 1000 nm wavelength light is within 25%/cm, better 20%/cm, and even better 15%/cm.

The method for production of the optoceramics according to the present invention comprises the step of manufacturing a molded body from a powder of the starting materials, wherein the powder of the starting materials comprises sintering aids in amounts of from 0.1 to 10% by weight. It is further preferred that the method for production of the ceramics according to the present invention comprises the following step:

e) Annealing of the pressurized and sintered molded body at temperatures between 600 and 1600° C. in an atmosphere that comprises oxygen.

By annealing the sintered body in an oxygen comprising atmosphere it is ensured that elements that might have been reduced in a foregoing process step are re-oxidized so that they may not impede the desirable optical properties of the optoceramic material.

EXAMPLES

Tables I and II describe examples of optoceramics that have been prepared according to the present invention.

TABLE I

| | Ex. 1 | Ex. 2 | Ex. 3 | Ex. 4 | Ex. 5 | Ex. 6 | Ex. 7 |
|---|---|---|---|---|---|---|---|
| Primary particle size in hafnia raw material (nm) | 20 | 40 | 100 | 300 | 490 | 50 | 150 |
| Primary particle size in Gd2O3 raw material (nm) | 50 | 80 | 250 | 250 | 250 | 50 | 50 |
| Mol % Gd2O3:HfO2 | 33:66 | 33:66 | 38:62 | 33:66 | 26:74 | 33:66 | 38:62 |
| TiO2 content (wt %) | 0.5 | 1 | 0.1 | 1 | 0.05 | 0.5 | 0.1 |
| Calcination | | | | | | | |
| Temperature (° C.) | 600 | 600 | 600 | 600 | 600 | 600 | 600 |
| Atmosphere | Air | Air | Air | Air | Air | Air | Air |
| Main sintering | | | | | | | |
| Temperature (° C.) | 1600 | 1650 | 1800 | 1600 | 1800 | 1750 | 1700 |
| Time (h) | 3 | 3 | 3 | 3 | 3 | 3 | 3 |
| Atmosphere | Vacuum | Vacuum | Vacuum | Vacuum | Vacuum | Vacuum | Vacuum |
| Relative density (%) after main sintering | 93 | 95 | 98 | 91 | 95 | 97 | 97 |
| HIP Conditions | | | | | | | |
| Temperature (° C.) | 1780 | 1780 | 1780 | 1780 | 1780 | 1780 | 1780 |
| Time (h) | 2 | 2 | 2 | 2 | 2 | 2 | 2 |
| Pressure media | Ar | Ar | Ar | Ar | Ar | Ar | Ar |
| Pressure (MPa) | 98 | 98 | 98 | 98 | 98 | 98 | 98 |
| Average particle size of sintered body (μm) | 50 | 70 | 70 | 20 | 80 | 60 | 30 |
| Transmittance (%) t = 5 mm | | | | | | | |
| @400 nm | 55 | 60 | 70 | 50 | 60 | 68 | 66 |
| @600 nm | 62 | 64 | 75 | 61 | 65 | 72 | 69 |
| Crystal structure after sintering | Cubic | Cubic | Cubic | Cubic | Cubic | Cubic | Cubic |

TABLE II

| | Ex. 8 | Ex. 9 | Ex. 10 | Ex. 11 | Ex. 12 | Ex. 13 | Ex. 14 |
|---|---|---|---|---|---|---|---|
| Primary particle size in hafnia raw material (nm) | 25 | 50 | 90 | 250 | 480 | 40 | 140 |
| Primary particle size in Y2O3 raw material (nm) | 80 | 50 | 250 | 250 | 250 | 100 | 50 |
| Mol % Y2O3:HfO2 | 38:62 | 33:66 | 26:74 | 33:66 | 38:62 | 26:74 | 26:74 |
| $SiO_2$ content (wt %) | 0.5 | 1 | 0.5 | 1 | 0.5 | 1 | 0.5 |
| Temporal sintering | | | | | | | |
| Temperature (° C.) | 700 | 700 | 700 | 700 | 700 | 700 | 700 |
| Atmosphere | Air | Air | Air | Air | Air | Air | Air |
| Main sintering | | | | | | | |
| Temperature (° C.) | 1600 | 1700 | 1800 | 1600 | 1700 | 1750 | 1800 |
| Time (h) | 3 | 3 | 3 | 3 | 3 | 3 | 3 |
| Atmosphere | Vacuum | Vacuum | Vacuum | Vacuum | Vacuum | Vacuum | Vacuum |
| Relative density (%) after main sintering | 90 | 95 | 95 | 90 | 96 | 98 | 95 |
| HIP Conditions | | | | | | | |
| Temperature (° C.) | 1780 | 1780 | 1780 | 1780 | 1780 | 1780 | 1780 |
| Time (h) | 2 | 2 | 2 | 2 | 2 | 2 | 2 |
| Pressure media | Ar | Ar | Ar | Ar | Ar | Ar | Ar |
| Pressure (MPa) | 98 | 98 | 98 | 98 | 98 | 98 | 98 |
| Average particle size of sintered body (μm) | 15 | 50 | 60 | 20 | 30 | 90 | 80 |
| Transmittance (%) T = 5 mm | | | | | | | |
| @400 nm | 51 | 62 | 60 | 52 | 61 | 71 | 60 |
| @600 nm | 61 | 67 | 66 | 63 | 65 | 75 | 65 |
| Crystal structure after sintering | Cubic | Cubic | Cubic | Cubic | Cubic | Cubic | Cubic |

BRIEF DESCRIPTION OF THE DRAWING

A flow chart showing a preferred embodiment of a method of making transparent polycrystalline pyrochlore is shown in the accompanying sole FIGURE.

While the invention has been illustrated and described as embodied in a method of making transparent ceramics it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A method of producing an optoceramic material, said method comprising the step of manufacturing a molded body from a powder mixture of starting materials, wherein said starting materials include at least one sintering aid selected from the group consisting of $SiO_2$, $TiO_2$, $ZrO_2$, $HfO_2$, $Al_2O_3$ and fluorides;
   wherein the optoceramic material produced by said method comprises at least 99% by weight of single crystals with a cubic crystal structure analogous to that of pyrochlore or fluorite and with a stoichiometry of $A_{2+x}B_yD_zE_7$, wherein $-1.15 \leq X \leq +1.1$, $0 \leq Y \leq 3$, $0 \leq Z \leq 1.6$ and $3X+4Y+5Z=8$;
   wherein A is at least one trivalent rare earth cation, B is at least one tetravalent cation, D is at least one pentavalent cation and E is at least one divalent anion;
   wherein the optoceramic material produced by the method has an average grain size in a range from 5 to 300 μm and is very densely sintered; and
   wherein a sample of the optoceramic material that has a thickness of 5 mm has an internal transmittance that is at least 50% at a wavelength of 400 nm and at least 60% at a wavelength of 600 nm.

2. The method according to claim 1, wherein A is selected from the group consisting of Y, Gd, Yb, Lu, Sc, La and mixtures of these elements.

3. The method according to claim 1, wherein B is selected from the group consisting of Zr, Ti, Hf, Sn, Ge and mixtures of these elements.

4. The method according to claim 1, further comprising the step of pre-sintering the molded body to form a pre-sintered molded body.

5. The method according to claim 4, wherein the pre-sintering takes place at temperatures between 500° C. and 900° C.

6. The method as defined in claim 4, further comprising the step of sintering of the pre-sintered molded body in vacuum.

7. The method according to claim 6, wherein the sintering takes place at temperatures between 1400° C. 1900° C.

8. The method according to claim 6, further comprising pressurizing the sintered molded body formed by the sintering.

9. The method according to claim 8, wherein the pressurizing of the sintered molded body takes place at temperatures between 1400° C. and 2000° C. and at pressures between 10 and 198 MPa.

10. The method according to claim 8, further comprising annealing the sintered molded body at temperatures between 600 and 1600° C. in an atmosphere that comprises oxygen after the pressurizing.

11. The method according to claim 1, wherein said starting materials comprise from 0.01 to 3% by weight of said at least one sintering aid.

12. The method according to claim 1, wherein said starting materials comprise from 0.01 to 10% by weight of said at least one sintering aid.

13. A method of producing an optoceramic material, said method comprising the step of manufacturing a molded body from a powder mixture of starting materials, wherein said starting materials include an effective amount of at least one sintering aid that improves optical properties of said optoceramic material produced by the method;

wherein said at least one sintering aid is selected from the group consisting of $SiO_2$, $TiO_2$, $ZrO_2$, $HfO_2$, $Al_2O_3$ and fluorides; and wherein the optoceramic material produced by said method comprises at least 99% by weight of crystals with a cubic crystal structure analogous to that of pyrochlore or fluorite and with a stoichiometry of $A_{2+X}B_y D_Z E_7$, wherein $-1.15 \leq X \leq +1.1$, $0 \leq Y \leq 3$, $0 \leq Z \leq 1.6$ and $3X+4Y+5Z=8$;

wherein A is at least one trivalent rare earth cation, B is at least one tetravalent cation, D is at least one pentavalent cation and E is at least one divalent anion;

wherein the optoceramic material produced by the method has an average grain size in a range from 5 to 300 μm and is very densely sintered; and wherein a sample of the optoceramic material that has a thickness of 5 mm has an internal transmittance that is at least 50% at a wavelength of 400 nm and at least 60% at a wavelength of 600 nm.

* * * * *